(12) United States Patent
Junge et al.

(10) Patent No.: US 9,453,661 B2
(45) Date of Patent: Sep. 27, 2016

(54) CONTROL SYSTEM FOR A DUAL EVAPORATOR REFRIGERATION SYSTEM

(71) Applicant: General Electric Company, Schenectady, NY (US)

(72) Inventors: Brent Alden Junge, Evansville, IN (US); Keith Wesley Wait, Louisville, KY (US); Bahman Abbasi, Louisville, KY (US)

(73) Assignee: Haier US Appliance Solutions, Inc, Wilmington, DE (US)

( * ) Notice: Subject to any disclaimer, the term of this patent is extended or adjusted under 35 U.S.C. 154(b) by 520 days.

(21) Appl. No.: 13/794,989

(22) Filed: Mar. 12, 2013

(65) Prior Publication Data

US 2014/0260409 A1    Sep. 18, 2014

(51) Int. Cl.
| | |
|---|---|
| *G01K 13/00* | (2006.01) |
| *F25D 17/02* | (2006.01) |
| *F25D 17/04* | (2006.01) |
| *F25B 5/00* | (2006.01) |
| *F25B 5/02* | (2006.01) |

(Continued)

(52) U.S. Cl.
CPC ................. *F25B 5/02* (2013.01); *F25B 40/00* (2013.01); *F25D 11/022* (2013.01); *F25D 29/003* (2013.01); *F25B 2400/23* (2013.01); *F25B 2600/112* (2013.01); *F25B 2700/2104* (2013.01); *F25D 2700/10* (2013.01); *F25D 2700/12* (2013.01); *F25D 2700/122* (2013.01); *F25D 2700/14* (2013.01); *Y02B 30/743* (2013.01); *Y02B 40/32* (2013.01)

(58) Field of Classification Search
CPC ..................... F25B 2400/23; F25B 2600/112; F25B 2700/2104; F25B 39/02; F25B 5/02; F25D 11/022; F25D 2700/10; F25D 2700/12; F25D 2700/122; F25D 2700/14
USPC ................................... 62/129, 185, 187, 199
See application file for complete search history.

(56) References Cited

U.S. PATENT DOCUMENTS 5,289,692 A * 3/1994 Campbell et al. .............. 62/181
5,966,946 A * 10/1999 Girard et al. ..................... 62/63

(Continued)

FOREIGN PATENT DOCUMENTS

| EP | 1 243 880 A1 | 9/2002 |
| EP | 2 386 812 A2 | 11/2011 |
| WO | 02/14759 A1 | 2/2002 |

OTHER PUBLICATIONS

International Search Report and Written Opinion issued in connection with corresponding PCT Application No. PCT/US2014/017591 on May 12, 2014.

*Primary Examiner* — Henry Crenshaw
(74) *Attorney, Agent, or Firm* — Dority & Manning, P.A.

(57) ABSTRACT

A control system for a refrigeration system with dual evaporators is provided. In one embodiment, a control system for a dual evaporator refrigeration system is provided where the evaporators are operated simultaneously to provide for improved temperature and humidity control in a refrigerator appliance. In another embodiment, the control system can also use a linear model that is designed to minimize or remove excess enthalpy from one or more compartments and/or features of the appliance. The control system can also be configured with at least one variable speed compressor that is operated at a speed that will remove excess enthalpy within a desired time period while also operating at an optimized speed for energy efficiency.

14 Claims, 6 Drawing Sheets

(51) Int. Cl.
   *F25D 11/02*    (2006.01)
   *F25D 29/00*    (2006.01)
   *F25B 40/00*    (2006.01)

(56) References Cited

U.S. PATENT DOCUMENTS

| | | | |
|---|---|---|---|
| 6,138,460 A | 10/2000 | Lee | |
| 6,343,477 B1* | 2/2002 | Mandel | F25D 17/042 62/186 |
| 6,694,754 B1 | 2/2004 | Schenk et al. | |
| 6,725,680 B1 | 4/2004 | Schenk et al. | |
| 2005/0132733 A1* | 6/2005 | Rafalovich et al. | 62/199 |
| 2005/0183429 A1* | 8/2005 | Rafalovich et al. | 62/155 |
| 2006/0168975 A1* | 8/2006 | Malone et al. | 62/180 |
| 2007/0012055 A1* | 1/2007 | Schenk et al. | 62/208 |
| 2008/0277486 A1* | 11/2008 | Seem | F24F 11/0009 236/49.3 |
| 2008/0289347 A1* | 11/2008 | Kadle et al. | 62/226 |
| 2010/0192618 A1* | 8/2010 | Zolli et al. | 62/428 |
| 2010/0193156 A1* | 8/2010 | Nakatani et al. | 165/63 |
| 2013/0061618 A1 | 3/2013 | Wait | |

* cited by examiner

US 9,453,661 B2

CONTROL SYSTEM FOR A DUAL EVAPORATOR REFRIGERATION SYSTEM

FIELD OF THE INVENTION

The subject matter of the present disclosure relates generally to a control system for a refrigeration system having dual evaporators.

BACKGROUND OF THE INVENTION

A commonly available design for a refrigeration appliance, particularly one for consumer use, includes a cabinet that contains a freezer compartment and a fresh food compartment. These compartments may be arranged e.g., side by side or may include one positioned over the other. In one example of a conventional design, the evaporator portion of a refrigeration loop is positioned in the freezer compartment where a fan moves air in the freezer compartment across the evaporator to freeze the contents of the freezer compartment. A damper positioned between the freezer compartment and the fresh food compartment is used to feed a portion of the air over to the fresh food compartment for cooling its contents.

To control the refrigeration loop that provides cooling for the refrigerator, one previous approach has been the use of a single thermostat such as e.g., a bimetallic thermostat. The compressor operates at a single speed and is cycled on or off based on the set point temperature of the thermostat and the air temperature in the refrigerator compartments.

While control based on the difference between the measured temperature and a temperature set point can be used to effectively control temperature, such methodology provides no direct way to minimize energy consumption of the appliance. For example, in a system based on thermostatic control of a compressor that can only operate at a single speed, cycling the compressor between on and off states may provide more cooling than is needed to reach the desired temperature set point. An overshoot can occur where the single speed compressor removes more heat than is necessary to reach the temperature set point, which results in inefficient energy usage.

A more modern approach to control includes the use of refrigerators having one or more controllers that execute a wide variety of algorithms for temperature control of the appliance. However, many of these controllers are based on complex, non-linear models of the heat transfer behavior of the appliance. Such non-linear controllers typically require a significant amount of tuning based on experimentation that must be performed for each different configuration or model of refrigeration appliance provided.

Additional complexity is encountered in controlling a refrigeration system that utilizes dual evaporators. For example, certain refrigerator appliances may use one evaporator in a fresh food storage compartment and another evaporator in a frozen food storage compartment. Typically, each such compartment has a different set-point temperature and thus each must be separately measured and maintained at the set-point temperature. Because the evaporators are frequently not operated simultaneously, temperature and humidity control in each compartment can be difficult to achieve and gradients may occur.

Therefore, a control system for a refrigerator appliance would be useful. More particularly, a control system for a refrigerator appliance that can determine the speed at which to operate the compressor so as to cool one or more components (including compartments and/or other features) to one or more desired temperature settings while also minimizing the amount of energy usage by the compressor would be useful. Such a control system that is based on a linear model that can be tuned analytically so as to reduce design time would also be useful. A control system that can be used to control a dual evaporator refrigeration system would also be useful.

BRIEF DESCRIPTION OF THE INVENTION

The present invention provides a control system for a refrigeration system having dual evaporators. In one embodiment, a control system for a dual evaporator refrigeration appliance is provided where the evaporators are operated simultaneously to provide for improved temperature and humidity control. In another embodiment, the control system can also use a linear model that is designed to minimize or remove excess enthalpy from one or more compartments and/or features of the appliance. The control system can also be configured with at least one variable speed compressor that is operated at a speed that will remove excess enthalpy within a desired time period while also operating at an optimized speed for energy efficiency. Additional aspects and advantages of the invention will be set forth in part in the following description, or may be apparent from the description, or may be learned through practice of the invention.

In one exemplary aspect of the present invention, a method of operating a refrigerator appliance is provided. The refrigerator appliance includes a fresh food storage compartment evaporator, a freezer storage compartment evaporator, and a compressor. The steps of the method includes receiving $T_{ff\text{-}SP}$, a set point temperature for a fresh food compartment; receiving $T_{fz\text{-}SP}$, a set point temperature for a freezer storage compartment; measuring $T_{amb}$, an ambient temperature; measuring $T_{ff}$, a temperature of the fresh food storage compartment; measuring $T_{fz}$, a temperature of the frozen food storage compartment; measuring $T_{ff\text{-}evap}$, a temperature of the fresh food storage compartment evaporator; measuring $T_{fz\text{-}evap}$, a temperature of the frozen food storage compartment evaporator; calculating $\tilde{V}_{ff\text{-}ss}$, an air flow rate for the fresh food storage compartment needed to maintain its temperature at $T_{ff\text{-}SP}$ during steady state conditions; calculating $\tilde{V}_{fs\text{-}ss}$, an air flow rate for the freezer storage compartment needed to maintain its temperature at $T_{fz\text{-}SP}$ during steady state conditions; calculating $\tilde{V}_{ff\text{-}sp}$, an air flow rate needed to reduce the fresh food storage compartment temperature to $T_{ff\text{-}SP}$ over a predetermined time period $t_{s\text{-}red\text{-}ff}$; calculating $\tilde{V}_{fz\text{-}sp}$, an air flow rate needed to reduce the freezer food storage compartment temperature to $T_{fz\text{-}SP}$ over a predetermined time period $t_{s\text{-}red\text{-}fz}$; determining $\tilde{V}_{ff\text{-}total}$, the total air flow rate required for the fresh food storage compartment, from $\tilde{V}_{ff\text{-}ss}$ and $\tilde{V}_{ff\text{-}sp}$; determining $\tilde{V}_{fz\text{-}total}$, the total air flow rate required for the freezer storage compartment, from $\tilde{V}_{fz\text{-}ss}$ and $\tilde{V}_{fz\text{-}sp}$; operating a first evaporator fan in the fresh food storage compartment at $S_{ff\text{-}fan}$, a fan speed that provides $\tilde{V}_{ff\text{-}total}$; and operating a second evaporator fan in the freezer storage compartment at $S_{ff\text{-}fan}$, a fan speed that provides $\tilde{V}_{fz\text{-}total}$.

In another exemplary embodiment of the present invention, a refrigerator appliance is provided. This exemplary appliance includes a fresh food compartment; a frozen food compartment; and a refrigeration loop. The refrigeration loop includes a fresh food compartment evaporator for providing cooling to the fresh food compartment; a frozen food compartment evaporator for providing cooling to the frozen food compartment; a condenser; a compressor; and an expansion device.

This exemplary appliance also includes a first evaporator fan configured to provide an air flow over the fresh food compartment evaporator; and a second evaporator fan configured to provide an air flow over the frozen food compartment evaporator. One or more controllers are configured to receive $T_{ff\text{-}SP}$, a set point temperature for the fresh food compartment; receive $T_{fz\text{-}SP}$, a set point temperature for the freezer storage compartment; receive $T_{amb}$, a measurement of ambient temperature; receive $T_{ff}$, a measurement of the temperature of the fresh food storage compartment; receive $T_{fz}$, a measurement a temperature of the frozen food storage compartment; receive $T_{ff\text{-}evap}$, a measure of a temperature of the fresh food storage compartment evaporator; receive $T_{fz\text{-}evap}$, a measure of a temperature of the frozen food storage compartment evaporator; calculate $\tilde{V}_{ff\text{-}ss}$, an air flow rate for the fresh food storage compartment needed to maintain its temperature at $T_{ff\text{-}SP}$ during steady state conditions; calculate $\tilde{V}_{fz\text{-}ss}$, an air flow rate for the freezer storage compartment needed to maintain its temperature at $T_{fz\text{-}SP}$ during steady state conditions; calculate $\tilde{V}_{ff\text{-}sp}$, an air flow rate needed to reduce the fresh food storage compartment temperature to $T_{ff\text{-}SP}$ over a predetermined time period $t_{s\text{-}red\text{-}ff}$; calculate $\tilde{V}_{fz\text{-}sp}$, an air flow rate needed to reduce the freezer food storage compartment temperature to $T_{fz\text{-}SP}$ over a predetermined time period $t_{s\text{-}red\text{-}fz}$; determine $\tilde{V}_{ff\text{-}total}$, the total air flow rate required for the fresh food storage compartment, from $\tilde{V}_{ff\text{-}ss}$ and $\tilde{V}_{ff\text{-}sp}$; determine $\tilde{V}_{fz\text{-}total}$, the total air flow rate required for the freezer storage compartment, from $\tilde{V}_{fz\text{-}ss}$ and $\tilde{V}_{fz\text{-}sp}$; operate the first evaporator fan at $S_{ff\text{-}fan}$, a fan speed that provides $\tilde{V}_{ff\text{-}total}$; and operate the second evaporator fan at $S_{fz\text{-}fan}$, a fan speed that provides $\tilde{V}_{fz\text{-}total}$.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
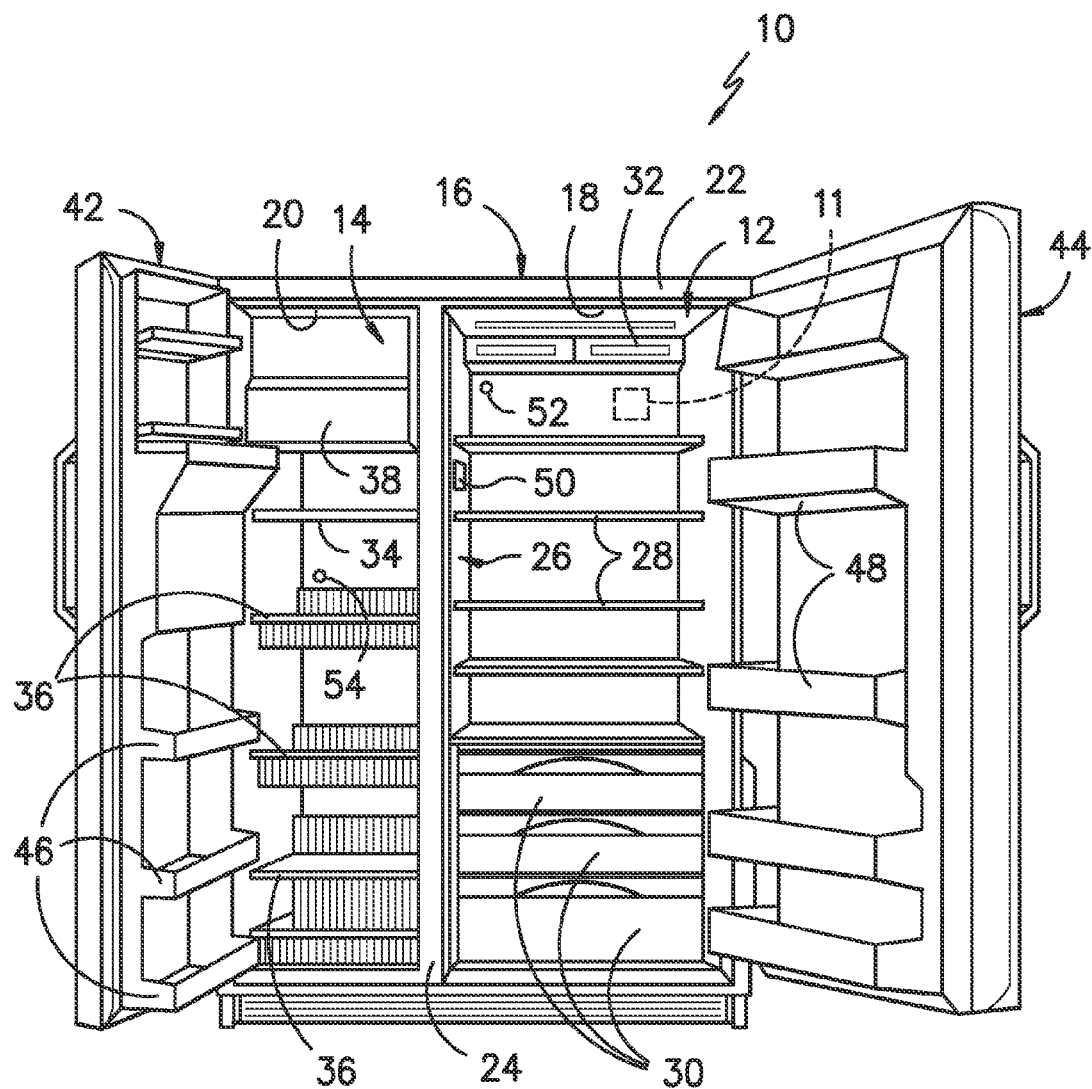
FIG. 1 provides an exemplary embodiment of a refrigerator appliance as may be used with the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front view of a representative refrigerator 10 in an exemplary embodiment of the present invention. More specifically, for illustrative purposes, the present invention is described with a refrigerator 10 having a construction as shown and described further below. As used herein, a refrigerator includes appliances such as a refrigerator/freezer combination, side-by-side, bottom mount, compact, and any other style or model of a refrigerator. Accordingly, other configurations including multiple and different styled compartments could be used with refrigerator 10, it being understood that the configuration shown in FIG. 1 is by way of example only.

Refrigerator 10 includes a fresh food storage compartment 12 and a freezer storage compartment 14. Freezer compartment 14 and fresh food compartment 12 are arranged side-by-side within an outer case 16 and defined by inner liners 18 and 20 therein. A space between case 16 and liners 18 and 20, and between liners 18 and 20, is filled with foamed-in-place insulation. Outer case 16 normally is formed by folding a sheet of a suitable material, such as pre-painted steel, into an inverted U-shape to form the top and side walls of case 16. A bottom wall of case 16 normally is formed separately and attached to the case side walls and to a bottom frame that provides support for refrigerator 10. Inner liners 18 and 20 are molded from a suitable plastic material to form freezer compartment 14 and fresh food compartment 12, respectively. Alternatively, liners 18, 20 may be formed by bending and welding a sheet of a suitable metal, such as steel.

A breaker strip 22 extends between a case front flange and outer front edges of liners 18, 20. Breaker strip 22 is formed from a suitable resilient material, such as an extruded acrylo-butadiene-styrene based material (commonly referred to as ABS). The insulation in the space between liners 18, 20 is covered by another strip of suitable resilient material, which also commonly is referred to as a mullion 24. In one embodiment, mullion 24 is formed of an extruded ABS material. Breaker strip 22 and mullion 24 form a front face, and extend completely around inner peripheral edges of case 16 and vertically between liners 18, 20. Mullion 24, insulation between compartments, and a spaced wall of liners separating compartments, sometimes are collectively referred to herein as a center mullion wall 26. In addition, refrigerator 10 includes shelves 28 and slide-out storage drawers 30, sometimes referred to as storage pans, which normally are provided in fresh food compartment 12 to support items being stored therein.

Mullion 24 or mullion wall 26 includes a damper 50 that is opened and closed to allow cooler air from the freezer compartment 14 into fresh food compartment 12. In one exemplary embodiment of the present invention, damper 50 can be a variable damper 50 meaning that its position can be dynamically adjusted between open and closed as well as all settings in between. For example, damper 50 can be set at 25 percent open, 36 percent open, 64 percent, open, and substantially all other values from 0 percent open to 100 percent open. The position of damper 50 can be determined by a sensor and/or e.g., the voltage or current provided to an actuator that operates variable damper 50. The position of the variable damper 50 can be determined by, and communicated to, variable damper 50 by a controller as will now be further described. Other control configurations may be used as well. A non-variable damper may also be used in exemplary embodiments of the present invention as well.

Refrigerator 10 can be operated by one or more controllers 11 or other processing devices according to programming and/or user preference via manipulation of a control interface 32 mounted e.g., in an upper region of fresh food storage compartment 12 and connected with the controller. The controller may include one or more memory devices and one or more microprocessors, such as a general or special purpose microprocessor operable to execute programming instructions or micro-control code associated with the operation of the refrigerator. The memory may represent random access memory such as DRAM, or read only memory such as ROM or FLASH. In one embodiment, the processor executes programming instructions stored in memory. The memory may be a separate component from the processor or may be included onboard within the processor. The controller may include one or more proportional-integral (PI) controllers programmed, equipped, or configured to operate the refrigerator appliance according to exemplary aspects of the control methods set forth herein. Accordingly, as used herein, "controller" includes the singular and plural forms.

The controller may be positioned in a variety of locations throughout refrigerator 10. In the illustrated embodiment, the controller may be located e.g., behind an interface panel 32 or doors 42 or 44. Input/output ("I/O") signals may be routed between the control system and various operational components of refrigerator 10 along wiring harnesses that may be routed through e.g., the back, sides, or mullion 26. Typically, through user interface panel 32, a user may select various operational features and modes and monitor the operation of refrigerator 10. In one embodiment, the user interface panel may represent a general purpose I/O ("GPIO") device or functional block. In one embodiment, the user interface panel 32 may include input components, such as one or more of a variety of electrical, mechanical or electro-mechanical input devices including rotary dials, push buttons, and touch pads. The user interface panel 32 may include a display component, such as a digital or analog display device designed to provide operational feedback to a user. The user interface panel may be in communication with the controller via one or more signal lines or shared communication busses.

In one exemplary embodiment of the present invention, one or more temperature sensors are provided to measure the temperature $T_{ff}$ in the fresh food compartment 12 and the temperature $T_{fz}$ in the freezer compartment 14. This temperature information can be provided, e.g., to the controller for use in operating refrigerator 10 as will be more fully discussed below. These temperature measurements may be taken intermittently or continuously during operation of the appliance and/or execution of a control system as further described below.

A shelf 34 and wire baskets 36 are also provided in freezer compartment 14. In addition, an ice maker 38 may be provided in freezer compartment 14. A freezer door 42 and a fresh food door 44 close access openings to freezer and fresh food compartments 14, 12, respectively. Each door 42, 44 is mounted to rotate about its outer vertical edge between an open position, as shown in FIG. 1, and a closed position (not shown) closing the associated storage compartment. Freezer door 42 includes a plurality of storage shelves 46, and fresh food door 44 includes a plurality of storage shelves 48.

Figure 2:
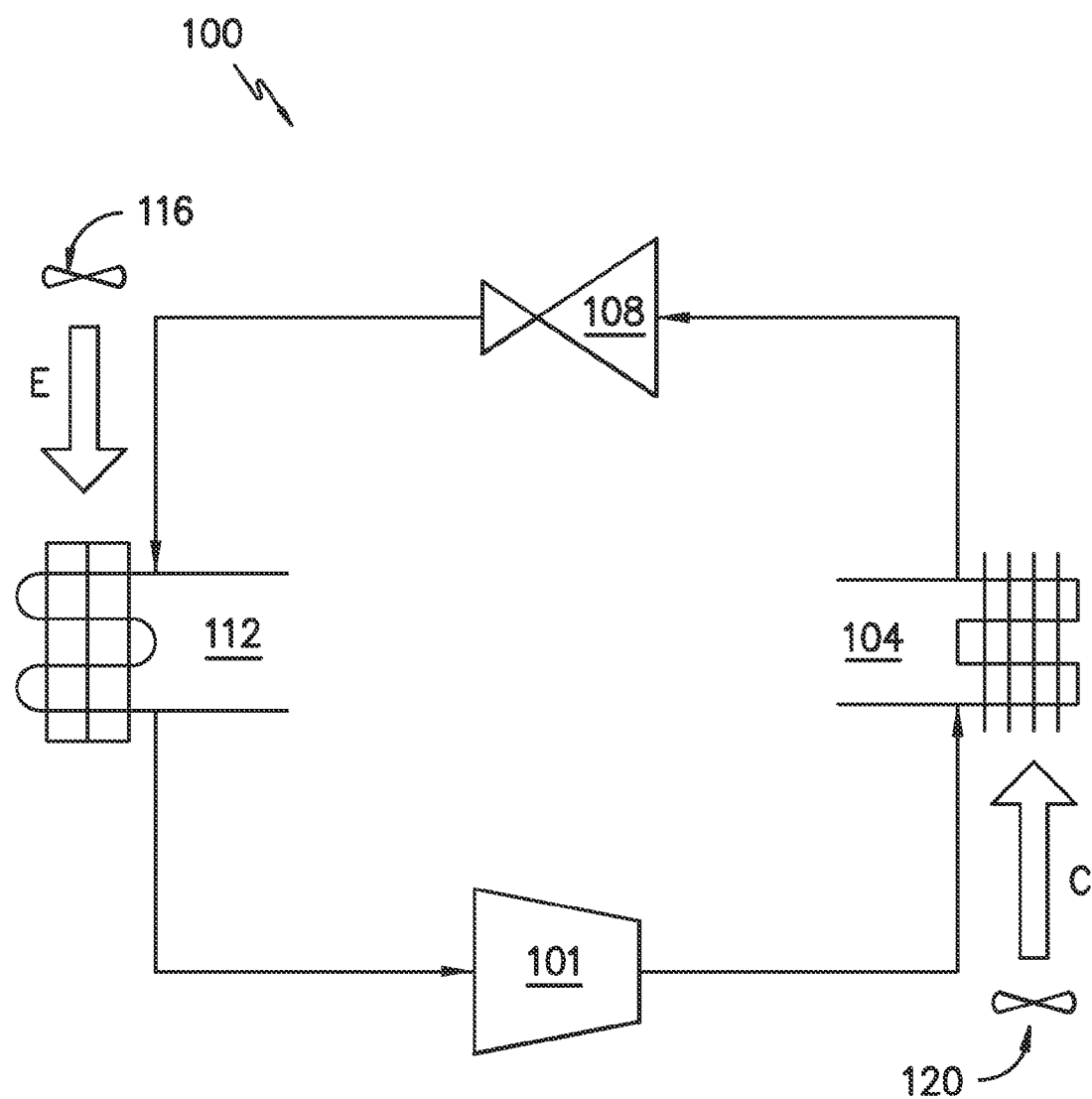
FIG. 2 is a schematic diagram of an exemplary refrigeration cycle as may be used with the present invention.

Refrigerator 10 can include a machinery compartment that incorporates at least part of the refrigeration loop or system 100 shown in FIG. 2. The components of refrigeration system 100 include a refrigerant compressor unit 101, a condenser 104, an expansion device 108, and an evaporator 112 all connected in series and charged with a refrigerant. Compressor unit 101 is a variable speed compressor. For example, the speed of compressor unit 101 can be varied between zero and 100 percent by the controller. A compressor with variable speed over other ranges may be used as well. The speed of compressor 101 can be determined by, and communicated to, compressor 101 by the controller.

Evaporator 112 is a type of heat exchanger that transfers heat from air passing over the evaporator 112 to a refrigerant flowing through evaporator 112, thereby causing the refrigerant to vaporize. Evaporator fan 116 is used to force air over evaporator 112 as shown by arrow E. As such, cooled air is produced and configured to refrigerate compartments 12, 14 of refrigerator 10. In one exemplary embodiment of the present invention, fan 116 can be a variable speed evaporator fan meaning the speed of fan 116 may be controlled or set anywhere between and including, for example, 0 and 100 percent. A fan having variable speed over other ranges may be used as well. The speed may be detected by a sensor and/or dynamically controlled through amperage or voltage. The speed of the evaporator fan 116 can be determined by, and communicated to, evaporator fan 116 by the controller Other control configurations may be used as well including a non-variable speed fan.

From evaporator 112, vaporized refrigerant flows to compressor unit 101, which increases the pressure of the refrigerant. This compression of the refrigerant raises its temperature, which is subsequently lowered by passing the gaseous refrigerant through condenser 104 where heat exchange with ambient air takes place so as to cool the refrigerant. Fan 120 is used to force air over the condenser for cooling the refrigerant as depicted by arrow C. Expansion device 108 (depicted in FIG. 2 as a single valve) is used to further reduce the pressure of refrigerant leaving condenser 104 before being fed as a liquid or liquid-gas mixture to evaporator 112. The refrigeration cycle 100 depicted in FIG. 2 is provided by way of example only. It is within the scope of the present invention for other configurations of the refrigeration system 100 to be used as well.

In the operation of refrigerator 10, typically a set point temperature is selected for one or more components of the refrigeration appliance. These set point temperatures may be selected by the user or may be preset by the manufacturer. As used herein, a component of the appliance may be the refrigeration compartment, the freezer compartment, an ice maker, the evaporator(s), and/or various other elements of a refrigerator appliance and its machinery compartment. A different set point temperature may be used for each such component. Of course, not all components of every appliance may have an independent set point temperature.

Accordingly, as used herein $T_{i\text{-}SP}$ represents the set point temperature that is selected for component i of a refrigeration appliance such as refrigerator 10, where i is an integer greater than or equal to one—depending on the number of components for which a temperature set point is desired. $T_i$ represents a temperature of each such component i, where such temperature can be measured e.g., using one or more temperature sensors in communication with one or more controllers of the appliance. For example, compartment 12 is configured with temperature sensor 52 while compartment 14 is configured with temperature sensor 54.

In an exemplary method of the present invention for operating a refrigerator appliance, enthalpy is used as a control parameter instead of temperature set point. More specifically, excess enthalpy $H_i$ (instead of the difference between temperature set point $T_{i\text{-}SP}$ and measured temperature $T_i$) of one or more components i is used as a control parameter as further described below. Furthermore, for a refrigerator appliance such as that described above, the inventors have determined that a model can be developed based on the enthalpy of air in certain components such as the fresh food storage compartment 12 and freezer storage compartment 14.

Using the refrigerator appliance 10 of FIGS. 1 and 2 by way of example, Equation 1 provides an energy balance that can be written for refrigerator 10:

$$H_n = H_{n-1} - \text{Cap} \times \Delta t \quad \text{Eqn. 1}$$

where
$H_n$=total excess enthalpy in the appliance at time n,
$H_{n-1}$=total excess enthalpy in the appliance at time n−1,
Cap=the rate of heat transfer from air to the evaporator, which is equated with the instantaneous cooling capacity provided by the compressor, and
$\Delta t$=time interval between n and n−1.

Equation 1 defines the total excess enthalpy H of the air in the refrigerator appliance 10 at any given time as the total excess enthalpy at the previous time step minus the amount of enthalpy removed from the system between the two measurements.

Excess enthalpy $H_i$ can also be defined as the difference in enthalpy of a refrigerator component i that is at a certain temperature $T_i$ and the same component when at the desired set point $T_{i\text{-}SP}$. For refrigerator appliance 10, the total excess enthalpy H for i components of refrigerator appliance 10 can be defined as the summation of the excess enthalpies $H_i$ of each component.

Accordingly, using air temperature to determine the excess enthalpy, Equation 2 (below) provides the total excess enthalpy H for refrigerator 10 modeled with two components (i=2) where the fresh food storage compartment 12 is represented with subscripts ff and the freezer storage compartment 14 is represented as fz:

$$H = m_{ff}(h_{ff} - h_{ff,sp}) + m_{fz}(h_{fz} - h_{fz,sp}) \quad \text{Eqn. 2}$$

where
$m_{ff}$=mass of air in compartment 12,
$h_{ff}$=air specific enthalpy in compartment 12 at the current temperature $T_i$,
$h_{ff,sp}$=air specific enthalpy in compartment 12 at the desired temperature $T_{i\text{-}SP}$,
$m_{fz}$=mass of air in compartment 14,
$h_{fz}$=air specific enthalpy in compartment 14 at the current temperature $T_i$,
and
$h_{fz\text{-}sp}$=air specific enthalpy in compartment 14 at the desired temperature $T_{i\text{-}SP}$.

As stated above, more components i could be used and added to Equation 2.

The mass of air in each compartment can be can be calculated as, $$m = \rho V \quad \text{Eqn. 3}$$

where
$\rho$=air density at the measured compartment temperature
V=total volume of the compartment.

In one exemplary control method of the present invention, the air density is calculated based on the measured compartment temperature. This approach can provide more accuracy than using a fixed density value because the density of air in each compartment changes significantly with temperature.

A complete energy balance to calculate excess enthalpy would include other terms such as heat leaks into the system from e.g., opening the doors 42 and 44, leaks through the case 16, and other factors. While these terms are generally unknown, the inventors have determined that a control system can be created that treats such events as disturbances to the system. As such, Equation 1 can be rearranged to the following form.

$$\frac{H_n - H_{n-1}}{\Delta t} = -\text{Cap} \Rightarrow \frac{\partial H}{\partial t} = -\text{Cap} \quad \text{Eqn. 4}$$

Accordingly, Equation 4 gives a method of calculating the rate of heat transfer from air to the evaporator 112, which is equal to the instantaneous cooling capacity that must be provided by compressor 101 or Cap. A more suitable form of the equation can be obtained by taking the Laplace transform of Equation 4, to provide the following Equation 5:

$$\frac{H}{\text{Cap}} = \frac{-1}{s} \quad \text{Eqn. 5}$$

Equation 5 provides the transfer function for the refrigerator 10 as modeled earlier using Equation 2. The inventors have determined that a goal of the control system is to reduce the excess enthalpy of each component of the system, $H_i$, to zero or substantially to some predetermined minimal value $H_{PMV}$. Stated alternatively, a goal of the control system is to reduce the total excess enthalpy H of refrigerator appliance 10 to zero. Applying this goal, a controller can be designed to determine the instantaneous required cooling capacity Cap that must be provided by compressor 101.

By way of example, a proportional integral controller (i.e. PI controller) using an integrator can accommodate for disturbances in the modeled system as discussed above as well as differences in the specific heat of various food items placed in refrigerator 10. A schematic example of such a controller 220 is shown in the block diagram of FIG. 3.

Figure 3:
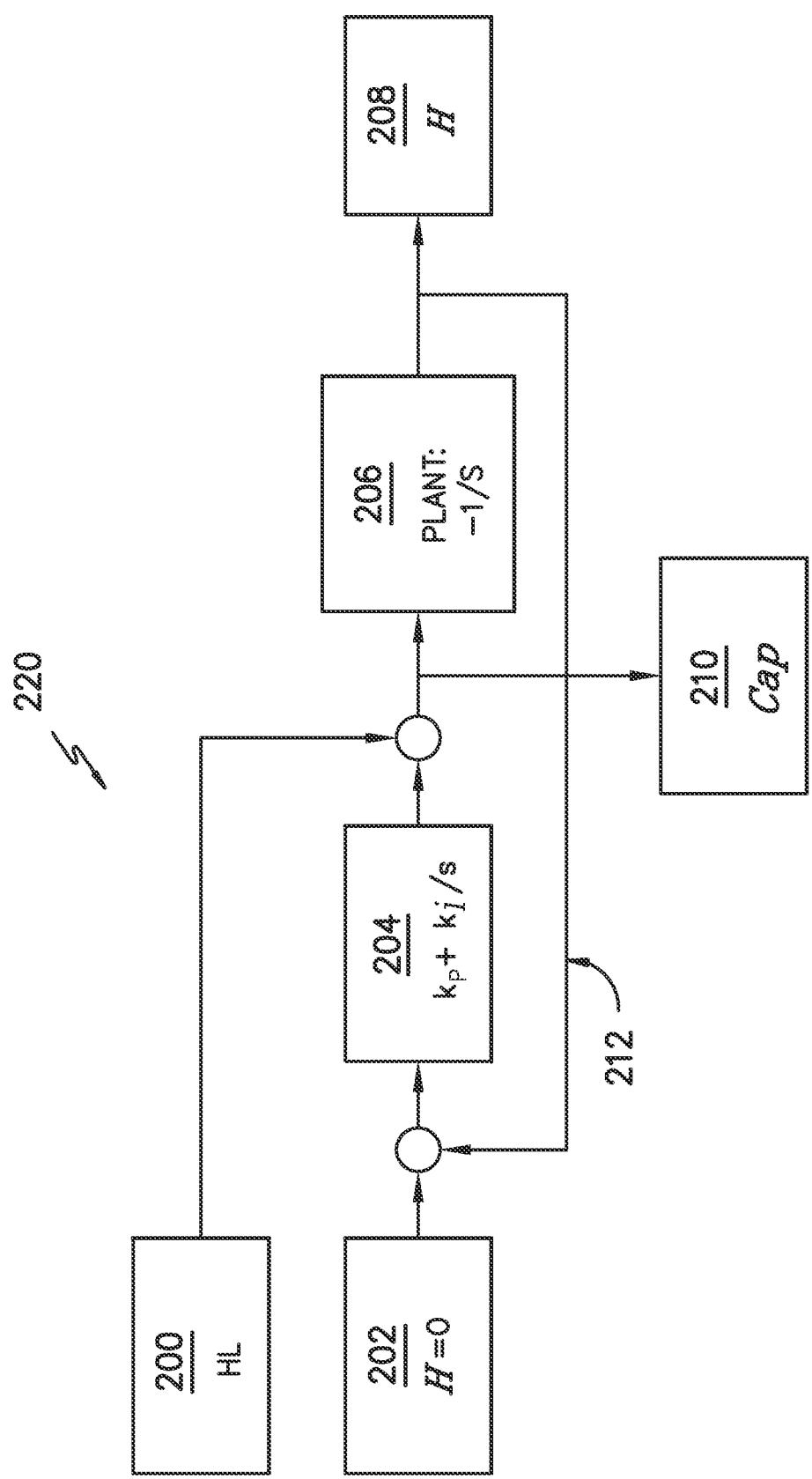
FIG. 3 is a schematic diagram of an exemplary controller of the present invention.

The set point 202 for controller 220 is for the excess enthalpy $H_i$ for one or more components i of the refrigeration system to be substantially zero. Where multiple components are involved (such as e.g., fresh food storage compartment 12 and freezer storage compartment 14), the total excess enthalpy H for all i components can be set to zero as indicated in FIG. 3. In alternative embodiments of the invention, the point 202 for controller 220 could be for excess enthalpy $H_i$ of a component or the total excess enthalpy $H_i$ of the appliance to be substantially at a predetermined minimum value $H_{PMV}$.

The output 210 of the controller is Cap, which is the instantaneous cooling capacity required of compressor 101. During operation of appliance 10, the set point temperature $T_{i\text{-}SP}$ for one or more components i is received by the controller 220 as well as the measured temperature $T_i$ for one or more components i. Illustrated as block 208 in FIG. 3, controller 220 then calculates the excess enthalpy $H_i$ for component i or the total excess enthalpy H for multiple components i, which provides the feedback signal 212. For this exemplary embodiment, HL in block 200 represents the heat leak into the system and can be inserted into controller 220 as a feed-forward term. While inputting HL can hasten the stabilization of the control system, HL is not a required term and can be dispensed with in other embodiments of the invention. HL can be a predetermined number, or a dynamic value determined based on the status and usage pattern of the system as identified by various sensors (temperature sensors, door sensors, etc).

Plant model 206 as introduced in Equation 5 above is a linear system and can be tuned analytically. The inventors have determined that this feature of control system 220 provides a substantial advantage over non-linear systems because minimal or no experimentation is required for tuning and such tuning can be applied to various models and platforms for a refrigerator appliance—not just the configuration shown in FIGS. 1 and 2. In contrast, non-linear systems can require significant design time and tuning parameter may vary significantly between models and platforms.

To tune the first order system represented by Equation 5 and FIG. 3, a value for a predetermined settling time $t_s$ is selected, which represents the amount of time in which one or more components i should each reach their respective desired set point temperatures $T_{i\text{-}SP}$. In another exemplary embodiment of the invention, settling time $t_s$ represents the amount of time in which one or more components i should each vary by no more than about 2 percent from their respective desired set point temperatures $T_{i\text{-}SP}$. Other percentages may be used as well.

For example, in one exemplary embodiment of the invention, settling time period $t_s$ is in the range of about 0.5 hours to about 2 hours. In another exemplary embodiment, $t_s$ is in the range of about 1 hours to about 2 hours. In still another exemplary embodiment, $t_s$ is about 1.5 hours.

Additionally, a predetermined value for a damping ratio $\zeta$ is selected. In one exemplary embodiment of the invention, damping ratio $\zeta$ is in the range of about 0.7 to 1.5. In still another exemplary embodiment of the invention, damping ratio $\zeta$ is about 1.

After receiving the predetermined values for damping ratio $\zeta$ and $t_s$, the proportional constant $k_p$ and integral constant $k_i$ in block 204 of FIG. 3 can be calculated by controller 220 using the following equations:

$$\omega_n = \frac{4}{\zeta t_s} \quad \text{Eqn. 6}$$

where
$\omega_n$ is a natural frequency,
$\zeta$ is a damping ratio, and
$t_s$ is the predetermined settling time.

$$k_p = 2\zeta\omega_n \quad \text{Eqn. 7}$$

$$k_i = k_p^2 + 2(1-\zeta)^2\omega_n^2 \quad \text{Eqn. 8}$$

By way of example, a settling time $t_s$ of 1.5 hrs (5400 s) for a critically damped system results in $k_p \approx 0.0015$ and $k_i \approx 2.25\text{e-}6$.

Once the required cooling capacity Cap is calculated, the controller can convert this into a signal—such as a PWM signal—that can be transmitted to the variable speed compressor 101. For every compressor, power and capacity are unique functions of evaporating temperature ($T_{ev}$), condensing temperature ($T_{cond}$), and compressor speed ($S_c$). Modern variable speed compressors can be provided with compressor charts that include multiple combinations of these parameters and their corresponding power consumption (Pow) and cooling capacity (Cap) values. Regressions can be used to determine the power and capacity functions.

With knowledge of $T_{ev}$, $T_{cond}$, $S_c$, and their corresponding values for Pow and Cap, relations can be developed in forms of Pow=P ($T_{ev}$, $T_{cond}$, $S_c$) and Cap=C ($T_{ev}$, $T_{cond}$, $S_c$). As will be understood by one of skill in the art using the teachings disclosed herein, the most efficient compressor operating speed to provide the required cooling capacity can then be determined by solving the following equation:

Minimize $P(T_{ev},T_{cond},S_c)$ with the constraint function
$C(T_{ev},T_{cond},S_c) \geq \text{Cap}, T_{amb} \leq T_{cond}$, and $$S_{c\,min} \leq S_c \leq S_{c\,max} \quad \text{Eqn. 9}$$

where $T_{amb}$ is the ambient temperature

Equation 9 is a non-linear constrained optimization problem to minimize power P while the delivered capacity is greater than the minimum required Cap, compressor speed $S_c$ is between the minimum $S_{c\,min}$ and maximum $S_{c\,max}$ allowable limits, and condensing temperature is constrained to be greater than the ambient temperature ($T_{amb}$) so as to exclude unrealistic solutions. The solution to the Equation 9 can be obtained in various ways including, for example, Sequential Linear Programming (SLP).

As previously stated, in certain refrigerator appliances, dual evaporators may be utilized. Using the refrigerator appliance 10 by way of example, one evaporator may be used to cool fresh food compartment 12 while another is used to cool frozen food compartment 14. A single refrigerant may be used in the refrigeration loop for such dual evaporator system. Alternatively, a dual refrigerant—referred to as a zeotropic refrigerant—may also be used.

Figure 4:
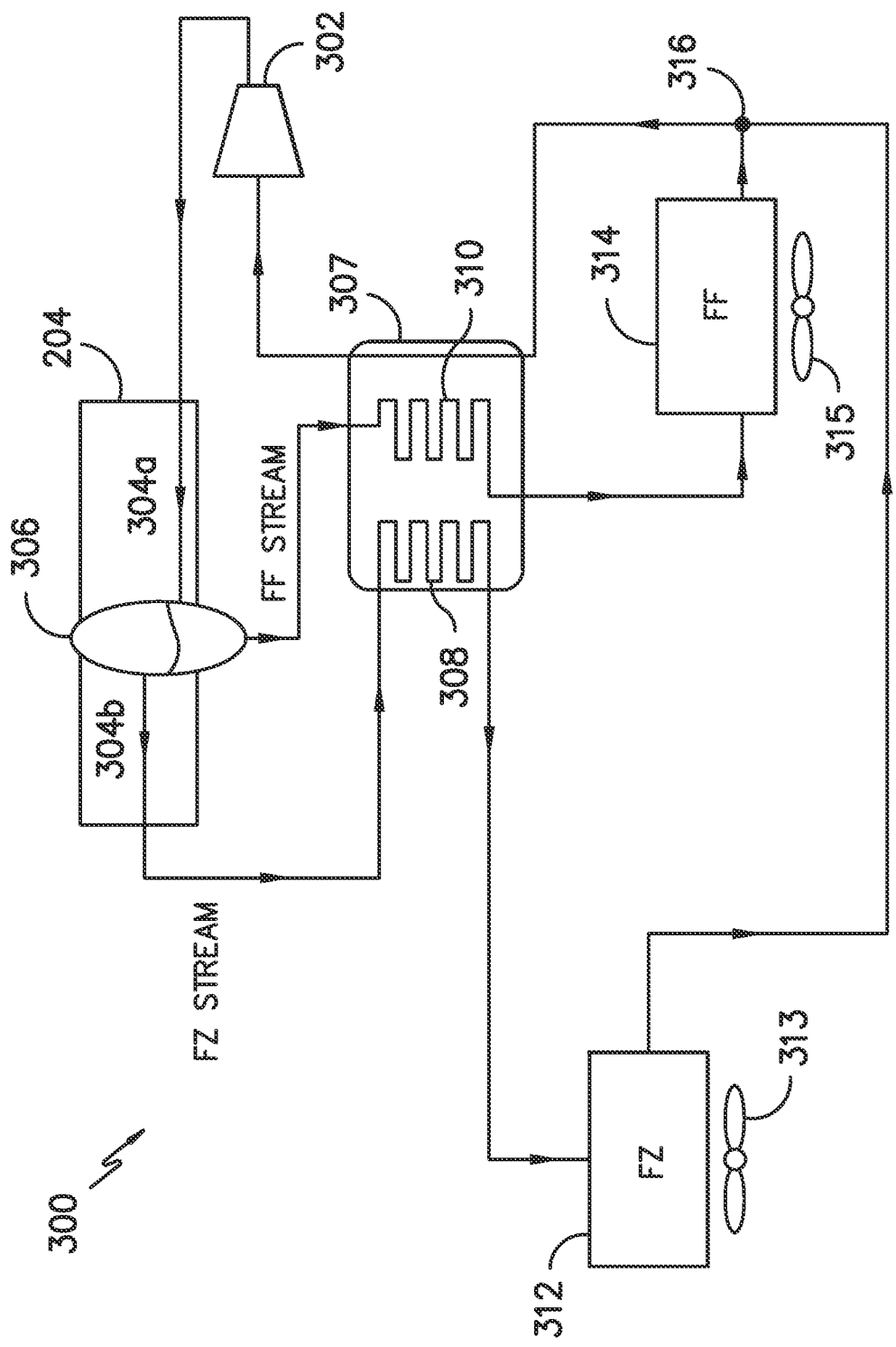
FIG. 4 is a schematic diagram of another exemplary refrigeration cycle as may be used with the present invention.

FIG. 4 provides a schematic diagram of an exemplary embodiment of such a refrigeration loop or system 300 having dual evaporators that may be used with appliance 10 and in which a zeotropic refrigerant is employed. As shown, the refrigeration system 300 includes a compressor 302 and a condenser 304. Condenser 304 includes a first portion 304a, a second portion 304b, and a phase separating component 306 connected to condenser 304 between the first and second portions 304a and 304b. Refrigeration system 300 also has a set of pressure reducing devices 307 including a first reducer 308 and a second reducer 310.

Fresh food evaporator 314 operates with a first evaporator fan 315 and freezer evaporator 312 operates with a second evaporator fan 313. A refrigerant stream union point 316 is positioned downstream of the evaporators. For this exemplary embodiment, expansion or reducing devices 308 and 310 can be configured as capillary tubes positioned in loop 300 between the condenser 304 and evaporators 312 and 314 as shown.

The refrigeration system 300 shown in FIG. 4 uses a zeotropic mixture of refrigerants as the operating refrigerant. Examples of refrigerants that can be used in a zeotropic mixture include but are not limited to R-134a, R245fa, R245ca and small amounts of R-600, R-600a or R-1234yf. Examples of refrigerants that may be used in a mixture with low Global Warming Potential (GWP) include R-600, R-600a, pentane, R290 and R-1234yf. Different mixture percentages of refrigerants may be used in dual evaporator refrigerant system 300.

Referring again to FIG. 4, the zeotropic refrigerant mixture in refrigeration system 300 enters compressor 302 in a thermodynamic state known as a "superheated vapor" and is compressed or pressurized to a higher pressure in compressor 302, resulting in a higher temperature as well. The hot, compressed vapor exiting the compressor 302 is still in a thermodynamic state known as a "superheated vapor," but it is now at a temperature and pressure at which it can be condensed at the temperature of the available cooling medium, for example the ambient air surrounding the refrigerator appliance.

In one embodiment, the refrigerant mixture exiting compressor 302 is about 30% R-134a and about 70% R-600a (i.e., a percent ratio of 30/70), at a temperature of about 117 degrees (Fahrenheit) and a pressure of about 114 psia. As is known, R-134a is a higher temperature refrigerant as compared to R-600a, i.e., the temperature at which R-134a refrigerant changes from a gas back to a liquid is higher than the temperature at which R-600a changes from a gas back to a liquid when subject to the same pressure.

The hot vapor mixture is routed to the condenser 304 where, in general, it is cooled and condensed into a liquid by flowing through a coil or tubes with cooling air flowing across the coil or tubes of condenser 304. The cooling air may typically be air in the room in which refrigerator 10 operates. The zeotropic refrigerant mixture is separated in condenser 304 by separating component 306, which may be e.g., a phase separator or a membrane. Separating component 306 separates the refrigerant into two different refrigerant streams. For example, using the refrigerant described above, each stream can have a different percentage ratio of R-134a and R-600a as compared to the other stream, and as compared to the refrigerant entering condenser 304.

For this exemplary embodiment, phase separator 306 is a bottle disposed in the condenser refrigerant line roughly midway through condenser 304 where the fluid is in part condensed liquid and in part uncondensed vapor thereby dividing condenser 304 into a first portion 304a and a second portion 304b. Phase separator 306 is configured such that the velocity of the refrigerant through the bottle is slow enough that a liquid layer forms at the bottom due to gravity and the vapor rises to the top of the bottle. Thus, a liquid phase mixture richer in the higher temperature refrigerant (e.g., R-134a) is separated from near the middle of condenser 304 and sent to second reducer 310 and then to the fresh food evaporator 314. The vapor in the bottle proceeds on through second portion 304b of the condenser 304 where it condenses to a liquid phase mixture rich in the lower temperature refrigerant (R-600a), which exits condenser 304 at the end of condenser 304 and is sent to first reducer 308 and then to freezer evaporator 312.

For the exemplary refrigerant mixture set forth above, the fresh food refrigerant stream exits condenser 304 by the phase separator at about 44.5% R-134a and about 55.5% R-600a (i.e., a percent ratio of 44.5/55.5), at a temperature of about 105 degrees (Fahrenheit) and a pressure of about 114 psia. The freezer refrigerant stream exits condenser 304 at about 15.5% R-134a and about 84.5% R-600a (i.e., a percent ratio of 15.5/84.5), at a temperature of about 94 degrees (Fahrenheit) and a pressure of about 114 psia.

The condensed refrigerant mixture travelling to freezer evaporator 312 is in a thermodynamic state known as a "saturated liquid" and is routed to the first reducer 308 where it undergoes a reduction in pressure. This pressure reduction results in the evaporation of a part of the liquid refrigerant. The lower pressure lowers the temperature of the liquid and vapor refrigerant mixture to where it is colder than the temperature of the enclosed compartment to be refrigerated. From the first reducer 308, the refrigerant mixture goes to the freezer evaporator 312 (e.g., the evaporator in freezer compartment 14 of refrigerator 10).

The condensed refrigerant mixture travelling to fresh food evaporator 314 is routed to the second reducer 310 where it undergoes a pressure reduction. From the second reducer 310, the refrigerant mixture goes to the fresh food evaporator 314 (e.g., evaporator in the fresh food compartment 12 of refrigerator 10). The two refrigerant streams pass substantially simultaneously to the two evaporators 312 and 314 so that each can operate at substantially the same time.

In each compartment to be cooled by an evaporator, a first evaporator fan 315 or second evaporator fan 313 circulates the air in the enclosed compartment (fresh food compartment 12 or frozen food compartment 14, respectively) across the coil or tubes of the respective evaporator carrying the cold refrigerant liquid and vapor mixture. The warm air evaporates the liquid part of the cold refrigerant mixture. At the same time, the circulating air is cooled and thus lowers the temperature of the enclosed compartment to a desired temperature.

To complete the refrigeration cycle, the refrigerant vapor exits each evaporator 312 and 314 as a "saturated vapor." The refrigerant vapor stream exiting the freezer evaporator 312 and the refrigerant vapor stream exiting the fresh food evaporator 314 are combined at stream union point 316 and routed back to the compressor 302. Advantageously, the refrigerants in both evaporators 312 and 314 evaporate at the same pressure (in this example, at about 16 pounds per square inch absolute or psia). Consequently, the union of the suction lines from the two evaporators 312 and 314 can be simply joined without need for any special devices or structure, such as a valve, pump or venturi.

The control system described above that is based on minimizing the total excess enthalpy $H_i$ of appliance 10 can be readily applied to the dual evaporator refrigeration system 300 show in FIG. 4. For example, the optimum compressor speed for operating both evaporators 312 and 314 to reduce the excess enthalpy in compartments 12 and 14 can be determined as previously set forth.

Figure 5:
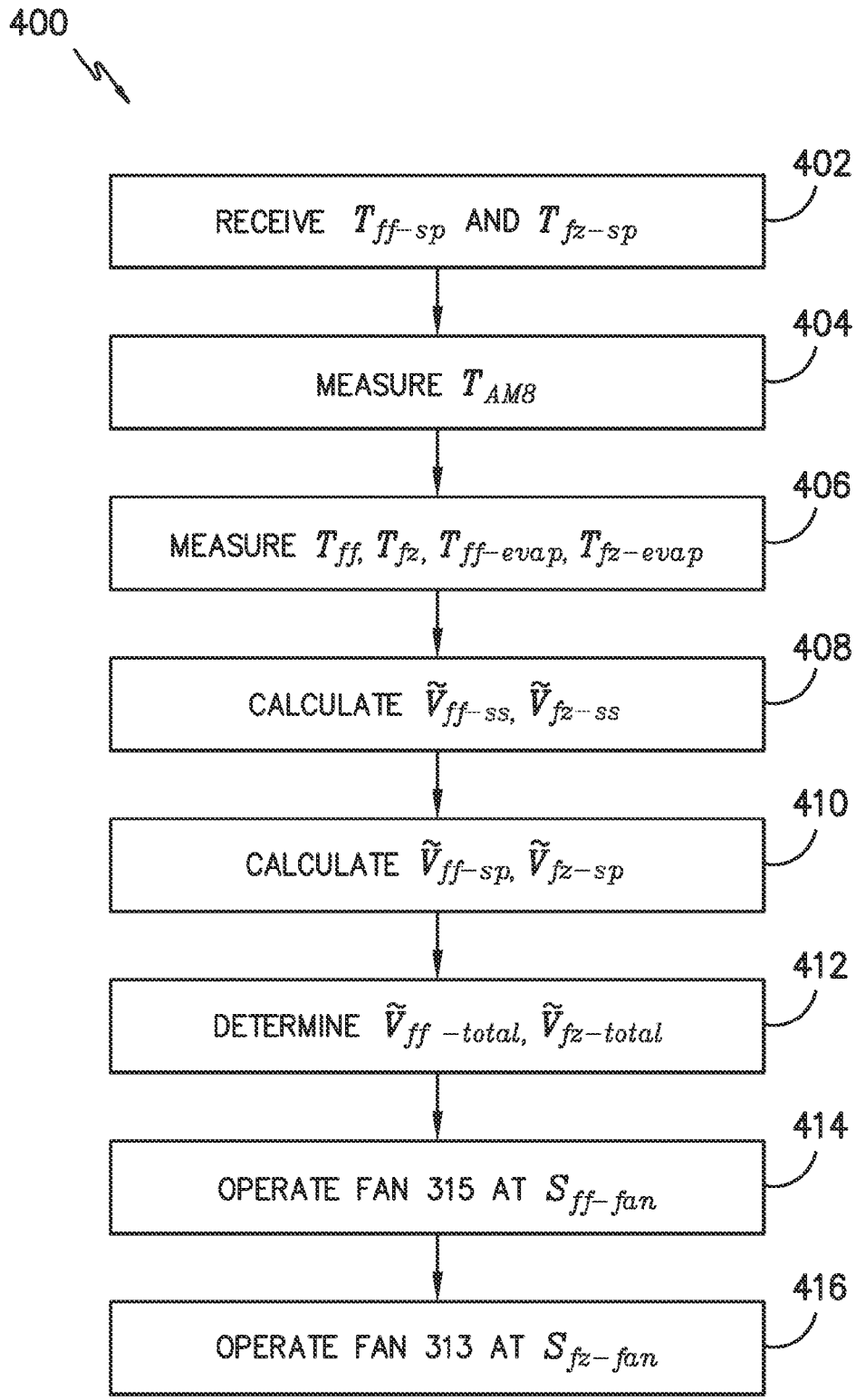
FIG. 5 is a schematic diagram of another exemplary controller of the present invention.

As will now be further described, additional control methods can be provided to further optimize the operation of a refrigeration device such as appliance 10 that is operating with dual evaporators such as evaporators 312 and 314. More particularly, an exemplary method 400 of operating a refrigerator appliance will now be described with reference to FIG. 5. As shown, method 400 is illustrated with blocks as steps 404 through 416. Using the teachings disclosed herein, however, it will be understood that each step shown could be arranged differently, divided into sub-steps, or added to in order to create additional exemplary methods of the present invention. Controller 11, for example, can be configured to operate according to the steps of method 400.

Beginning with step 402, a set point temperature for the fresh food compartment $T_{ff\text{-}SP}$ and a set point temperature for the freezer storage compartment $T_{fz\text{-}SP}$ are received by e.g., the controller of appliance 10. By way of example, $T_{ff\text{-}SP}$ and $T_{fz\text{-}SP}$ could be provided as settings that are input by the user of appliance 10 using control interface 32 (FIG. 1) or could be present temperature set points provided by the manufacture. Regardless, $T_{ff\text{-}SP}$ and $T_{fz\text{-}SP}$ represents the desired set point temperatures in compartments 12 and 14, respectively.

Next, in step 404, the ambient temperature is measured and received by controller 11. For example, refrigerator 10 could be equipped with a temperature sensor configured for measuring the temperature of the air that is external to appliance 10 and provided as a signal that is received by controller 11. Alternatively, this measurement could be transmitted wirelessly from another device and received by the controller 11 of appliance 10. In one embodiment of the invention, such temperature measurement can occur continuously or intermittently during operation of appliance 10.

In step 406, the following temperatures are measured and received by controller 11: $T_{ff}$, a temperature of the fresh food storage compartment; $T_{fz}$, a temperature of the frozen food storage compartment; $T_{ff\text{-}evap}$, a temperature of the fresh food storage compartment evaporator; and $T_{fz\text{-}evap}$, a temperature of the frozen food storage compartment evaporator. For example, the temperature in each of these compartments could be measured by a temperature sensor strategically placed in each compartment and configured for providing a signal with the measurement that is received by controller 11 of appliance 10. In one embodiment of the invention, such measurements can occur continuously or intermittently during operation of appliance 10.

Continuing with step 408, and using the temperature information from the previous steps, the following is calculated by controller 11: $\tilde{V}_{ff\text{-}ss}$, an air flow rate for the fresh food storage compartment 12 needed to maintain its temperature at $T_{ff\text{-}SP}$ during steady state conditions; and $\tilde{V}_{fz\text{-}ss}$, an air flow rate for the freezer storage compartment 14 needed to maintain its temperature at $T_{fz\text{-}SP}$ during steady state conditions. By way of example, $\tilde{V}_{ff\text{-}ss}$ represents the volumetric air flow rate across evaporator 312 that is needed to maintain fresh food compartment 12 at $T_{ff\text{-}SP}$ when the temperature $T_{ff}$ of the compartment 12 is substantially at $T_{ff\text{-}SP}$. Similarly, $\tilde{V}_{fz\text{-}ss}$ represents the volumetric air flow rate across evaporator 314 that is needed to maintain frozen food compartment 14 at $T_{fz\text{-}SP}$ when the temperature $T_{fz}$ of the compartment 14 is substantially at $T_{fz\text{-}SP}$. As will be understood using the teachings disclosed herein, $\tilde{V}_{ff\text{-}ss}$ and $\tilde{V}_{fz\text{-}ss}$ can be readily calculated from the temperature information describe above using energy balance equations in each compartment.

In step 410, using the temperature information from the previous steps, the following is calculated by controller 11: $\tilde{V}_{ff\text{-}sp}$, an air flow rate over evaporator 314 needed to reduce the fresh food storage compartment temperature $T_{ff}$ to $T_{ff\text{-}SP}$ over a predetermined time period $t_{s\text{-}red\text{-}ff}$; and $\tilde{V}_{fz\text{-}sp}$, an air flow rate over evaporator 312 needed to reduce the freezer food storage compartment temperature $T_{fz}$ to $T_{fz\text{-}SP}$ over a predetermined time period $t_{s\text{-}red\text{-}fz}$.

The time periods $t_{s\text{-}red\text{-}ff}$ and $t_{s\text{-}red\text{-}fz}$ can be arbitrarily determined within the capacity of compressor 302. By way of example, the values for these time periods can be pre-programmed into controller 11 or could be part of a selection that a user makes with interface 32. Controller 11 could incorporate, for example, use a PID (proportional-integral-derivative) compensator 506 (FIG. 6) to make such calculations as will be understood by one of skill in the art using the teachings disclosed herein.

Next, in step 412, the total air flow rates across each evaporator 312 and 314 are determined by controller 11. More specifically, controller 11 determines $\tilde{V}_{ff\text{-}total}$, the total air flow rate required for the fresh food storage compartment, from $\tilde{V}_{ff\text{-}ss}$ and $\tilde{V}_{ff\text{-}sp}$. Additionally, controller 11 determines $\tilde{V}_{fz\text{-}total}$, the total air flow rate required for the freezer storage compartment, from $\tilde{V}_{fz\text{-}ss}$ and $\tilde{V}_{fz\text{-}sp}$. In each case the total may be the sum of the individual flow rates e.g., $\tilde{V}_{ff\text{-}total}$ could be calculated as $\tilde{V}_{ff\text{-}ss} + \tilde{V}_{ff\text{-}sp}$.

In steps 414 and 416, fans 313 and 315 are operated at the speeds required to provide $\tilde{V}_{fz\text{-}total}$ and $\tilde{V}_{ff\text{-}total}$, respectively. First evaporator fan 315 is operated at $S_{ff\text{-}fan}$, a fan speed that provides $\tilde{V}_{ff\text{-}total}$ while second evaporator fan 313 is operated at $S_{fz\text{-}fan}$, a fan speed that provides $\tilde{V}_{fz\text{-}total}$. As will be understood by one of skill in the art, $S_{ff\text{-}fan}$ and $S_{fz\text{-}fan}$ can each be calculated using predetermined relationships that incorporate e.g., the operating characteristics of fans 313 and 315 as well as any associated ducting and/or dampers if present.

Figure 6:
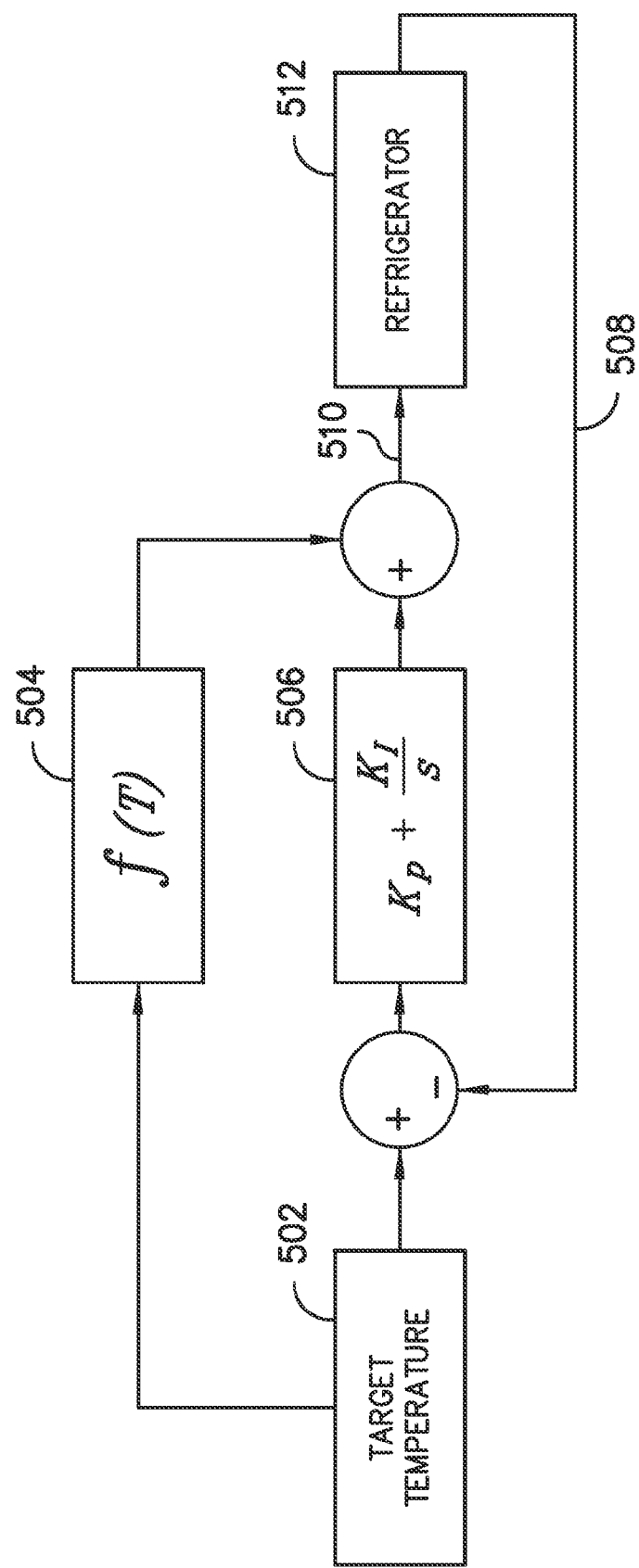
FIG. 6 illustrates an exemplary method of the present invention.

FIG. 6 provides a schematic diagram of the control method for fan 313 or fan 315 that is applied in method 400. Block 502 represents the target or setpoint temperature of step 402 that is desired in compartment 12 or 14. Block 502 represents a feed-forward path of step 408 where the flow rates needed to maintain steady conditions are provided. Line 508 represents a feed-back path of step 310 where flow rates needed to reduce measured temperatures to the setpoints are provided. Block 506 represents the PID compensator. Line 510 represents the fan speed of fan 313 or 315 as provided by steps 412 and 414 or 416. Finally, block 512 represents refrigerator 10 where temperature measurements such as in step 406 are made.

In other exemplary methods of the present invention, additional steps may be employed with method 400. For example, a minimum fan speed $S_{ff\text{-}fan\text{-}min}$ for the first evaporator fan 315 can be specified. This may be a speed below which fan 315 does not provide significant air flow other specifications may be used as well. Knowing $S_{ff\text{-}fan\text{-}min}$, a determination is made regarding whether compressor 302 is operating. If compressor 302 is operating, then controller 11 is configured to maintain first evaporator fan 315 at a fan speed of at least $S_{ff\text{-}fan\text{-}min}$. Alternatively, if compressor 302 is not operating, first evaporator fan 315 can be deactivated.

Similarly, a minimum fan speed $S_{fz\text{-}fan\text{-}min}$ for the second evaporator fan 313 can be specified. This may be a speed below which fan 313 does not provide significant air flow—other specifications may be used as well. Knowing $S_{fz\text{-}fan\text{-}min}$, a determination is made regarding whether compressor 302 is operating. If compressor 302 is operating, then controller 11 is configured to maintain second evaporator fan 313 at a fan speed of at least $S_{fz\text{-}fan\text{-}min}$. Alternatively, if compressor 302 is not operating, second evaporator fan 313 can be deactivated.

In still another exemplary method, both $S_{ff\text{-}fan\text{-}min}$ and $S_{fz\text{-}fan\text{-}min}$ can be provided. With these minimum speeds, controller 11 is configured to ascertain the speed of the first evaporator fan 315 and the speed of the second evaporator fan 313. Controller 11 can be further configured to deactivate compressor 302 if the first evaporator fan speed is at or below $S_{ff\text{-}fan\text{-}min}$ and the second evaporator fan speed is at or below $S_{fz\text{-}fan\text{-}min}$.

In still another exemplary method, controller 11 can be further configured in method 400 to deactivate compressor 302 if $T_{ff}$ is more than a predetermined value below $T_{ff\text{-}SP}$. For example, a difference of 2 degrees Celsius or more could be used—other values may be used as well.

Although embodiments of the dual evaporator control system of the present invention have been described using refrigerator appliance 10, it should be understood that the such control system can be used with any refrigeration system where dual evaporators are employed simultaneously to cool two or more compartments or components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance, the refrigerator appliance comprising a fresh food storage compartment evaporator, a freezer storage compartment evaporator, and a compressor, the steps of the method comprising:
   receiving $T_{ff\text{-}sp}$, a set point temperature for the fresh food compartment;
   receiving $T_{fz\text{-}sp}$, a set point temperature for the freezer storage compartment;
   measuring $T_{amb}$, an ambient temperature;
   measuring $T_{ff}$ a temperature of the fresh food storage compartment;
   measuring $T_{fz}$, a temperature of the frozen food storage compartment;
   measuring $T_{ff\text{-}evap}$, a temperature of the fresh food storage compartment evaporator;
   measuring $T_{fz\text{-}evap}$, a temperature of the frozen food storage compartment evaporator;
   calculating $\tilde{V}_{ff\text{-}ss}$, an air flow rate for the fresh food storage compartment needed to maintain its temperature at $T_{ff\text{-}SP}$ during steady state conditions;
   calculating $\tilde{V}_{fz\text{-}ss}$, an air flow rate for the freezer storage compartment needed to maintain its temperature at $T_{fz\text{-}SP}$ during steady state conditions;
   calculating $\tilde{V}_{ff\text{-}sp}$, an air flow rate needed to reduce the fresh food storage compartment to $T_{ff\text{-}sp}$ over a predetermined time period $t_{s\text{-}red\_ff}$;
   calculating $\tilde{V}_{fz\text{-}sp}$, an air flow rate needed to reduce the freezer food storage compartment to $T_{fz\text{-}SP}$ over a predetermined time period $t_{s\text{-}red\_fz}$;
   determining $\tilde{V}_{ff\text{-}total}$, the total air flow rate required for the fresh food storage compartment, from $\tilde{V}_{ff\text{-}ss}$ and $\tilde{V}_{ff\text{-}sp}$;
   determining $\tilde{V}_{fz\text{-}total}$, the total air flow rate required for the freezer storage compartment, from $\tilde{V}_{fz\text{-}ss}$ and $\tilde{V}_{fz\text{-}sp}$;
   determine $S_{ff\text{-}fan}$, a fan speed that provides $\tilde{V}_{ff\text{-}total}$, including using a predetermined relationship between speed of the first evaporator fan and a resulting air flow of the first evaporator fan;
   determine $S_{fz\text{-}fan}$, a fan speed that provides $\tilde{V}_{fz\text{-}total}$, including using a predetermined relationship between speed of the second evaporator fan and a resulting air flow of the second evaporator fan;
   operating a first evaporator fan in the fresh food storage compartment at $S_{ff\text{-}fan}$, and
   operating a second evaporator fan in the freezer storage compartment at $S_{fz\text{-}fan}$.

2. A method of operating a refrigerator appliance as in claim 1, further comprising the steps of:
   providing $S_{ff\text{-}fan\text{-}min}$, a minimum fan speed for the first evaporator fan; and
   determining if the compressor is operating and maintaining the first evaporator fan at a fan speed of at least $S_{ff\text{-}fan\text{-}min}$ if the compressor is operating, or deactivating the first evaporator fan of the compressor is not operating.

3. A method of operating a refrigerator appliance as in claim 1, further comprising the steps of:
   providing $S_{fz\text{-}fan\text{-}min}$, a minimum fan speed for the second evaporator fan; and
   determining if the compressor is operating and maintaining the second evaporator fan at a fan speed of at least $S_{fz\text{-}fan\text{-}min}$ if the compressor is operating, or deactivating the second evaporator fan of the compressor is not operating.

4. A method of operating a refrigerator appliance as in claim 1, further comprising the step of:
   providing $S_{ff\text{-}fan\text{-}min}$, a minimum fan speed for the first evaporator fan;
   providing $S_{fz\text{-}fan\text{-}min}$, a minimum fan speed for the second evaporator fan;
   ascertaining the speed of the first evaporator fan;
   ascertaining the speed of the second evaporator fan; and
   deactivating the compressor if the first evaporator fan speed is at $S_{ff\text{-}fan\text{-}min}$ and the second evaporator fan speed is at $S_{fz\text{-}fan\text{-}min}$.

5. A method of operating a refrigerator appliance as in claim 4, further comprising the step of
   deactivating the compressor if $T_{ff}$ is more than a predetermined value below $T_{ff\text{-}SP}$.

6. A method of operating a refrigerator appliance as in claim 1, further comprising the step of pressurizing a zeotropic refrigerant with the compressor.

7. A method of operating a refrigerator appliance as in claim 1, further comprising the steps of
   calculating an excess enthalpy $H_{ff}$ of the fresh food compartment using $T_{ff\text{-}sp}$ and $T_{ff}$;
   calculating an excess enthalpy $H_{fz}$ of the frozen food compartment using $T_{fz\text{-}sp}$ and $T_{fz}$;
   determining an instantaneous cooling capacity required Cap to reduce the excess enthalpy $H_{ff}$ and the excess enthalpy $H_{fz}$ substantially to zero within a selected time period $T_s$;
   calculating $S_c$, a compressor speed that delivers at least the instantaneous cooling capacity required Cap while minimizing power consumption of the compressor; and
   operating the compressor at compressor speed of at least $S_c$, as determined from said step of calculating.

8. A refrigerator appliance, comprising:
   a fresh food compartment;
   a frozen food compartment;
   a refrigeration loop comprising
      a fresh food compartment evaporator for providing cooling to the fresh food compartment;
      a frozen food compartment evaporator for providing cooling to the frozen food compartment;
      a condenser;
      a compressor; and
      an expansion device;
   a first evaporator fan configured to provide an air flow over the fresh food compartment evaporator;
   a second evaporator fan configured to provide an air flow over the frozen food compartment evaporator;
   one or more controllers configured to
      receive $T_{ff\text{-}sp}$, a set point temperature for the fresh food compartment;
      receive $T_{fz\text{-}sp}$, a set point temperature for the freezer storage compartment;
      receive $T_{amb}$, a measurement of ambient temperature;
      receive $T_{ff}$, a measurement of a temperature of the fresh food storage compartment;
      receive $T_{fz}$, a measurement of a temperature of the frozen food storage compartment;

receive $T_{ff\text{-}evap}$, a measure of a temperature of the fresh food storage compartment evaporator;

receive $T_{fz\text{-}evap}$, a measure of a temperature of the frozen food storage compartment evaporator;

calculate $\tilde{V}_{ff}$, an air flow rate for the fresh food storage compartment needed to maintain the fresh food storage compartment at the temperature $T_{ff\text{-}SP}$ during steady state conditions;

calculate $\tilde{V}_{fz\text{-}ss}$, an air flow rate for the freezer storage compartment needed to maintain the freezer storage compartment at the temperature $T_{fz\text{-}SP}$ during steady state conditions;

calculate $\tilde{V}_{ff\text{-}sp}$, an air flow rate needed to reduce the fresh food storage compartment temperature to $T_{ff\text{-}sp}$ over a predetermined desired time period $t_{s\text{-}red\text{-}ff}$;

calculate $\tilde{V}_{fz\text{-}sp}$, an air flow rate needed to reduce the freezer food storage compartment temperature to $T_{fz\text{-}sp}$ over a predetermined desired time period $t_{s\text{-}red\text{-}fz}$;

determine $\tilde{V}_{ff\text{-}total}$, the total air flow rate required for the fresh food storage compartment, the $\tilde{V}_{ff\text{-}total}$ including $\tilde{V}_{ff\text{-}ss}$ and $\tilde{V}_{ff\text{-}sp}$;

determine $\tilde{V}_{fz\text{-}total}$, the total air flow rate required for the freezer storage compartment, the $\tilde{V}_{fz\text{-}total}$ including $\tilde{V}_{fz\text{-}ss}$ and $\tilde{V}_{fz\text{-}sp}$;

determine $S_{ff\text{-}fan}$, a fan speed that provides $\tilde{V}_{ff\text{-}total}$, including using a predetermined relationship between speed of the first evaporator fan and a resulting air flow of the first evaporator fan;

determine $S_{fz\text{-}fan}$, a fan speed that provides $\tilde{V}_{fz\text{-}total}$ using a predetermined relationship between speed of the second evaporator fan and a resulting air flow of the second evaporator fan;

operate the first evaporator fan at $S_{ff\text{-}fan}$; and operate the second evaporator fan at $S_{fz\text{-}fan}$.

9. A refrigerator appliance as in claim 8, wherein the one or more controllers are further configured to:

provide $S_{ff\text{-}fan\text{-}min}$, a minimum fan speed for the first evaporator fan;

determine if the compressor is operating; and maintain the first evaporator fan at a fan speed of at least $S_{ff\text{-}fan\text{-}min}$ if the compressor is operating, or deactivate the first evaporator fan if the compressor is not operating.

10. A refrigerator appliance as in claim 8, wherein the one or more controllers are further configured to:

provide $S_{fz\text{-}fan\text{-}min}$, a minimum fan speed for the second evaporator fan;

determine if the compressor is operating; and maintain the second evaporator fan at a fan speed of at least $S_{fz\text{-}fan\text{-}min}$ if the compressor is operating, or deactivate the second evaporator fan if the compressor is not operating.

11. A refrigerator appliance as in claim 8, wherein the one or more controllers are further configured to:

provide $S_{ff\text{-}fan\text{-}min}$, a minimum fan speed for the first evaporator fan;

provide $S_{fz\text{-}fan\text{-}min}$, a minimum fan speed for the second evaporator fan;

ascertain the speed of the first evaporator fan;

ascertain the speed of the second evaporator fan; and deactivate the compressor if the first evaporator fan speed is at $S_{ff\text{-}fan\text{-}m}$ and the second evaporator fan speed is at $S_{fz\text{-}fan\text{-}min}$.

12. A refrigerator appliance as in claim 11, wherein the one or more controllers are further configured to:

deactivate the compressor if $T_{ff}$ is more than a predetermined value below $T_{ff\text{-}SP}$.

13. A refrigerator appliance as in claim 11, wherein the refrigeration loop further comprises a zeotropic refrigerant.

14. A refrigerator appliance as in claim 13, wherein the refrigeration loop further comprises a phase separating component configured to substantially separate different phases of the zeotropic refrigerant.

* * * * *